United States Patent [19]

Vogt

[11] Patent Number: 4,864,342

[45] Date of Patent: Sep. 5, 1989

[54] OPTICAL BENCH

[76] Inventor: Philippe Vogt, Frohalpstrasse 65, 8038 Zürich, Switzerland

[21] Appl. No.: 218,663

[22] Filed: Jul. 13, 1988

[30] Foreign Application Priority Data

Jul. 14, 1987 [CH] Switzerland .............. 2673/87

[51] Int. Cl.⁴ ............................................. G03B 29/00
[52] U.S. Cl. ..................................... 354/293; 354/81; 350/321
[58] Field of Search .............. 354/81, 187, 191, 192, 354/193, 194, 293; 350/321; 248/177, 289.1, 291

[56] References Cited

U.S. PATENT DOCUMENTS

| 434,622 | 8/1890 | Ball | 354/81 |
| 1,849,305 | 3/1932 | Magarian | 350/321 |
| 3,130,632 | 4/1964 | Borrowdale | 354/293 |
| 3,745,903 | 7/1973 | Studly | 354/191 |
| 4,735,389 | 4/1988 | Graham | 354/293 |

FOREIGN PATENT DOCUMENTS 368053 4/1963 Switzerland .

Primary Examiner—A. A. Mathews
Attorney, Agent, or Firm—Ostrolenk, Faber, Gerb & Soffen

[57] ABSTRACT

The optical bench includes two rodlike members having the same cross-sectional shape. The members are connected foldably on opposite ends by a device having a spring leaf. The optical bench is attached in a working position by a latch mechanism. In the folded position the optical bench forms a handy unit, the handling of which is easy.

6 Claims, 1 Drawing Sheet

OPTICAL BENCH

BACKGROUND OF THE INVENTION

This invention relates to optical devices particularly an optical bench for an universal camera.

DESCRIPTION OF THE PRIOR ART

A two-piece optical bench is known, wherein the members are used separately or rigidly connected by means of screws. This optical bench works well. However, its transposition from one-piece to two-piece or multi-piece is complicated.

The Swiss Patent No. 368 053 discloses a set of pieces for mounting an optical bench, wherein the parts of the bench can be connected by means of permanently-kept-together means.

These optical benches have the disadvantages that the parts after dismounting are separated completely and that tools are necessary for dismounting the parts.

SUMMARY OF THE INVENTION

It is an object of the invention to provide an optical bench.

This object is attained by the characteristic features set forth herein.

The advantages of the optical bench are to be essentially seen in that the folded optical bench can be joined with the camera and that the optical bench is easier to handle.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENT

Figure 1:
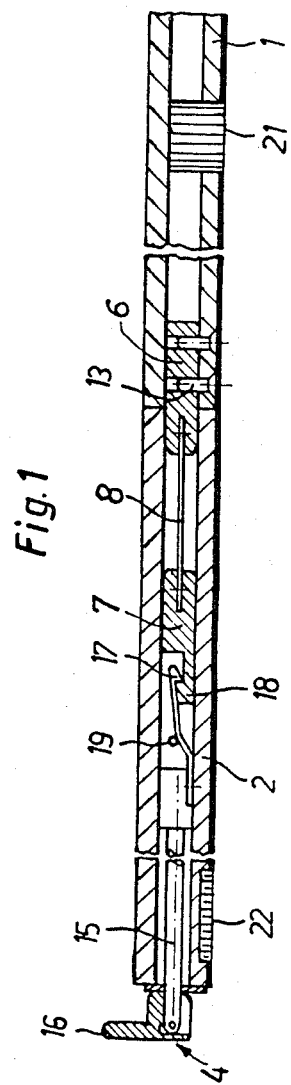
FIG. 1 is a longitudinal section of an optical bench in usable position.
Figure 2:
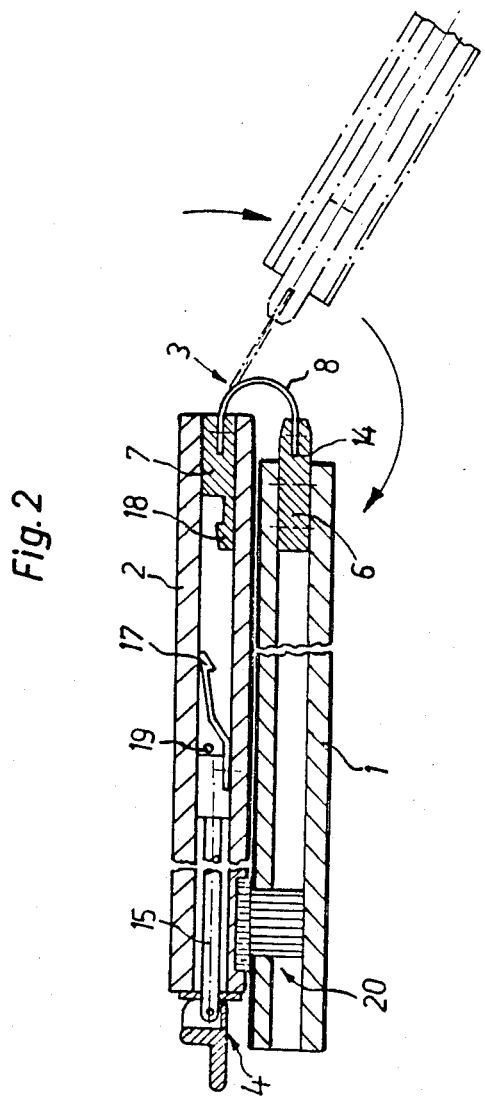
FIG. 2 is a longitudinal section of the optical bench in a folded position.

As is obvious from FIGS. 1 and 2, the optical bench includes substantially two rodlike members 1, 2, a device 3 joining both said members 1, 2 together and a mechanism to latch said members 1, 2 in a working position.

Both members 1, 2 are manufactured from a rod of hollow section and have at least partly the same cross section and the same length. Also the length of members 1, 2 can be different.

A device 3 is arranged in said members 1, 2. The device comprises a first part 6 fixed on said first member 1, a second part 7, onto which the other member 2 is movably arranged and a spring-steel crossband 8 fixed to said first and second parts at the ends.

As FIG. 1 shows, the first part 6 is fixed to said first member 1 by means of two screws 13. The fixing is such that a portion 14 of the first part 6 protrudes from the end of the member 1 (FIG. 2). The other member 2 is movably disposed onto said second part 7. The mechanism 4 includes an operation rod 15 having an eccentric lever 16 at one end and a hook-like means 17 at the other end. This means 17 is arranged in said member 2 such that the operation rod 15 is operable from outside by means of the eccentric lever 16. A hook-like portion 18 is formed within the second part 7. The hook-like portion 18 is being engagable with the hook-like means 17. A pin 19 is mounted in the second member 2 in order to engage the hook-like means 17 with the hook-like portion 18.

Further a holding device 20 is provided, which device consists of two permanent magnets. The permanent magnets are each arranged in one of the members 1, 2 such that they superpose on one another, when the members are folded up (FIG. 2).

In order to fold up the optical bench the operation rod 15 is advanced in the direction to the second part 7 of the device 3 and the means 17 and the portion 18 are disengaged by shifting the eccentric lever 16. The second member 2 is drawn off from the first part 6 of the device 3 by pulling in axial direction until the spring-steel crossband is unencumbered. The first member 1 then is folded up and held in this position.

In order to bring the optical bench in the working position the first member 1 will be folded back and the second member 2 is pushed on the device 3 until both members 1, 2 abut against one another. In this position the portion 14 protruding from the second member 2 extends into the first member 1, whereby a rigid connecting is provided. The hook-like means 17 is brought in engagement with the hook-like portion 18 on the second part 7 by shifting of the eccentric lever 16. Thus the first and second members 1, 2 are latched. In this position the hook-like element 17 is urged against the second part 7 by means of the pin 19.

It has to be provided for, that on the one hand the measurements of the cross section of the second part 6 and of the holes in the first and second member are constructed accordingly and on the other hand the shape of the cross section can be in any form to provide the rigid connection.

In an advantageous manner a two-piece or multipiece arrangement can be used in place of the unitary elastic part 8.

While there is shown and described a present preferred embodiment of the invention, it is to be distinctly understood that the invention is not limited thereto, but may be otherwise variously embodied and practiced within the scope of the following claims.

I claim:

1. Optical bench comprising a first and second rodlike member, a device connecting said members and for folding said members from a rest position to a working position and vice versa; said device includes at least one movable part fixed to said first member and arranged shiftable in longitudinal direction on said second member and further comprising a mechanism to fix said members in the working position, said mechanism is a latch mechanism disposed in the second member and engagable and disengagable with said device.

2. Optical bench of claim 1, wherein said movable part consists of a spring-steel crossband.

3. Optical bench of claim 1, wherein said latch mechanism includes a hook-like means for holding said device, an operation member having an eccentric lever which operation member is connected to the hook-like means and a pin extending into the path of motion of the hook-like means in order to bring said means in engagement with said device.

4. Optical bench of claim 3, wherein the hook-like means consists of spring steel.

5. Optical bench of claim 3, wherein the hook-like means consists of plastic.

6. Optical bench of claim 1, wherein a plurality of members is provided and adjacent members are connected by the connecting device.

* * * * *